United States Patent [19]

Kinkead et al.

[11] Patent Number: 4,686,718
[45] Date of Patent: Aug. 18, 1987

[54] METHOD AND APPARATUS FOR AUTOMATICALLY MAINTAINING A PREDETERMINED DESIRED LEVEL OF WATER IN A SWIMMING POOL, AND THE LIKE

[75] Inventors: Clifford W. Kinkead, Phoenix; David W. Kinkead, Glendale, both of Ariz.

[73] Assignee: Aqua Systems, Inc., Phoenix, Ariz.

[21] Appl. No.: 715,383

[22] Filed: Mar. 25, 1985

[51] Int. Cl.$^4$ .............................................. F16K 1/18
[52] U.S. Cl. ........................................ 4/508; 137/428
[58] Field of Search ........................ 4/507, 508, 509; 137/428

[56] References Cited

U.S. PATENT DOCUMENTS

| | | | |
|---|---|---|---|
| 2,809,752 | 10/1957 | Leslie | 4/508 |
| 2,835,270 | 5/1958 | York et al. | 4/508 |
| 3,908,206 | 9/1975 | Grewing | 4/508 |
| 4,211,249 | 7/1980 | Richards | 4/508 |
| 4,373,220 | 2/1983 | Selsted | 4/508 |
| 4,380,091 | 4/1983 | Lively | 4/508 |
| 4,445,238 | 5/1984 | Maxhimer | 4/508 |

Primary Examiner—Stephen Marcus
Assistant Examiner—Leo J. Peters
Attorney, Agent, or Firm—Charles P. Padgett, Jr.

[57] ABSTRACT

An improved method and apparatus for automatically monitoring the level of water in a swimming pool, or the like, by monitoring the level of a float within a float chamber supported by water siphoned from the pool system, for detecting when the level of water has fallen a predetermined amount or distance below a predetermined desired level and for controlling the input of fresh water into the pool system in response to the detected level for restoring the water in the pool to the predetermined desired level as determined by the position of the float on the siphoned water within the float chamber being restored to a float position indicative of said predetermined desired level of water in the pool.

12 Claims, 6 Drawing Figures

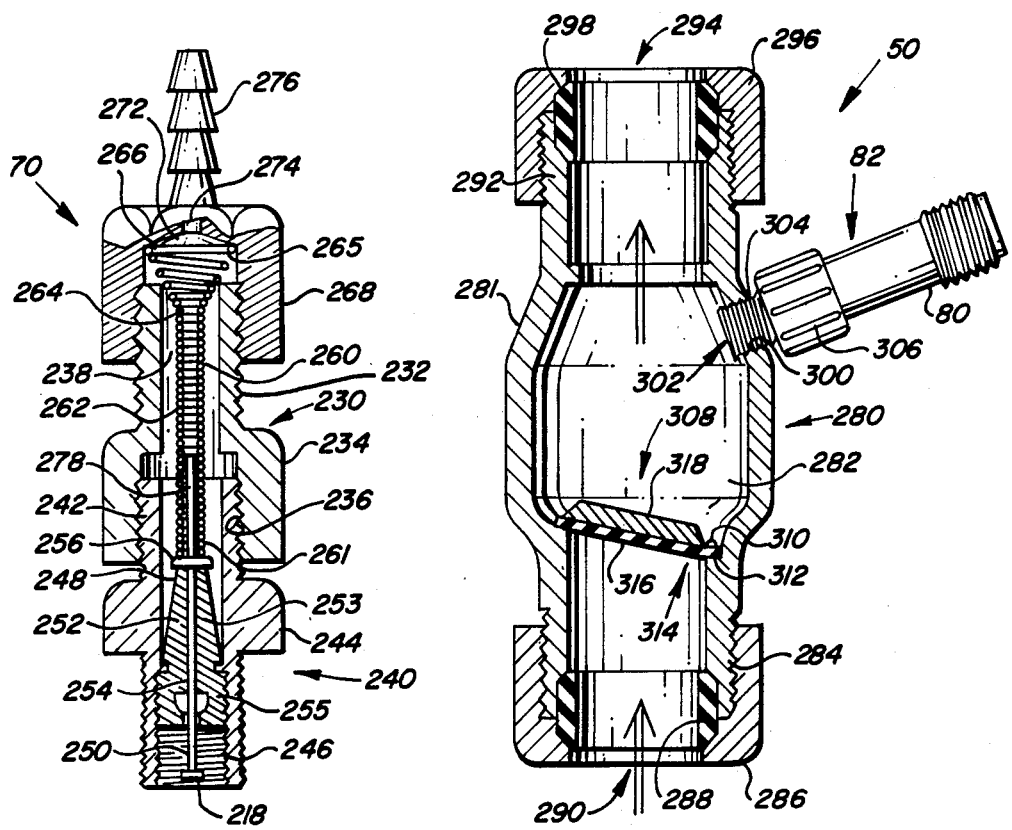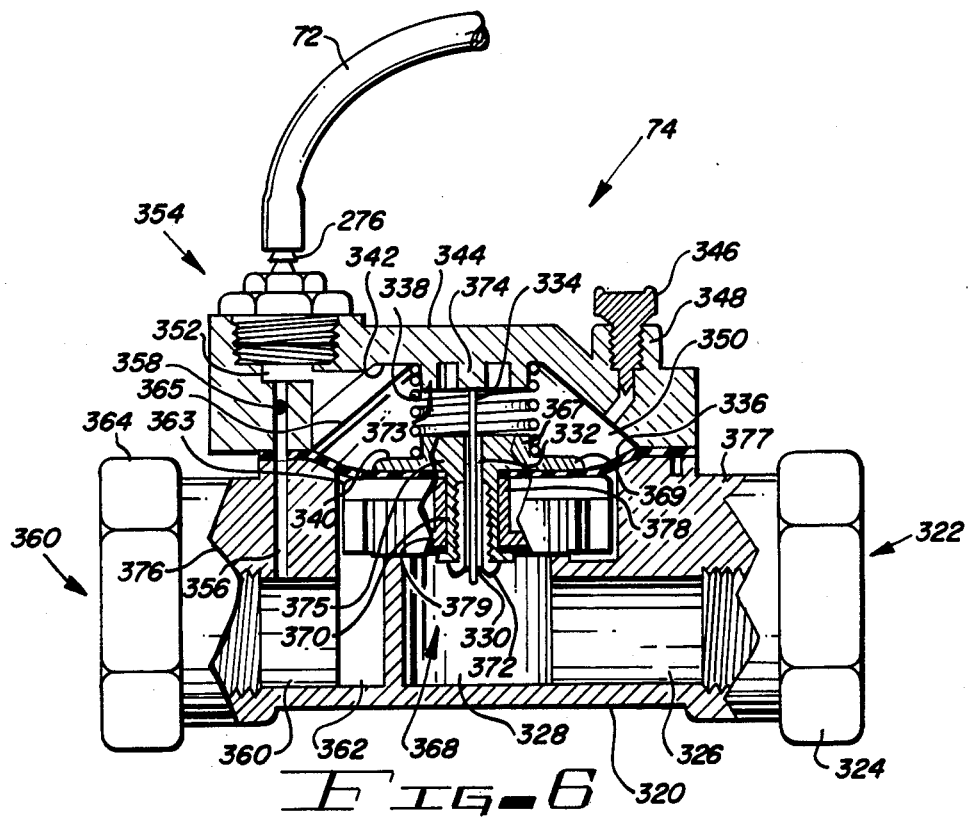

4,686,718

METHOD AND APPARATUS FOR AUTOMATICALLY MAINTAINING A PREDETERMINED DESIRED LEVEL OF WATER IN A SWIMMING POOL, AND THE LIKE

BACKGROUND OF THE INVENTION

1. Field of the Invention

The invention relates generally to automatic systems for maintaining a predetermined desired level of water in a swimming pool or the like, and more particularly to an automatic system for monitoring the actual level of water in the pool by the position of a float supported within a float chamber on water siphoned from the recirculation system of the pool, detecting whenever the level of water in the pool is at least a predetermined distance or amount below a predetermined desired level, as indicated by the float position, and for controlling the input of fresh water into the pool in response to the detected level for restoring the water level in the pool to the predetermined desired level as indicated by the float having been returned to said float level indicative of the predetermined desired water level by the additional water siphoned into the float chamber from the pool or pool circulation system.

2. Description of the Prior Art.

Outdoor swimming pools of all shapes and sizes and of all types and configurations are in relatively wide use today for recreation, exercise, therapy and entertainment. Most of such pools are designed or constructed to operate with a predetermined desired water level that must be maintained within relatively close limits to insure proper operation of the water circulation and filter systems associated with the pool. This presents a problem in the upkeep and maintenance of the pool for most people. Such problems have included the necessity of removing foreign matter from the pool by filtering or the like; a requirement for adding various chemical agents to control the level of bacteria, algae and the clarity of the water; and, particularly in hot dry or arid areas, the necessity for adding additional water to maintain a predetermined desired level of water in the pool to make up for water losses due to evaporation, spillage, and the like, in order to insure proper operation of the system.

Typically, foreign matter has been filtered from the pool water through a recirculation filtration system which includes a circulating pump, a filter and a fluid conduit connecting the filtration system in a circulation-type path between a pool outlet and a pool inlet. Such prior art filtration systems have commonly been automatically timed so as to provide an automated removal of foreign matter with only periodic maintenance of the pump and filter being required of the pool owner.

Failure to fill the pool to the predetermined desired level after use or evaporation has lowered the level of water in the pool, may result in damage to the associated pump, heater, filter or recirculation system as a whole. A sufficient drop in the level of water in the pool will render the recirculation system or at least the skimmer portion totally inoperative. Typically, the water level in the swimming pool has been maintained manually by continually observing the level visually and periodically adding water as required from a garden hose, or the like. Since this requires personal attention by the pool owner it is a definite inconvenience, and attempts have been made to develop a system for automatically adjusting the water level in the pool.

Typically, such prior art attempts involved the mounting of a simple float valve at pool side. When the pool level drops the float valve opens a pipe leading to a fresh water source and water is added to the pool until the raised level then closes the float valve. However, such systems presents several additional problems, including the necessity for building an expensive addition or anomaly to the pool wall in order to mount the float valve, and the potential for damage or injury being afflicted upon the valve and upon users of the pool by the valve are serious problems. The fact that the poolside location exposes the entire valve mechanism to the corrosive action of the various chemical agents in the pool leads to even further serious problems and complications.

Various techniques of the prior art are known for filling and/or draining swimming pools and these are generally described in U.S. Pat. Nos. 2,739,939; 2,809,752; 2,891,845; 3,386,197; 3,739,405; 3,848,627; 3,895,402; 3,908,206; 3,997,925; 4,211,249; and 4,373,220. None of the prior art attempts have actually solved the above-stated problems without creating even more additional problems of their own.

In nearly every case, the retrofitting of an existing pool with equipment for automatically controlling the water level usually involved expensive and undesirable reconstruction of the pool and the surrounding decking or at least required complicated valve systems, conduits and controls. Therefore, an urgent and long-felt need continues to exist for an automatic pool level adjusting system which does not require that a structural anomaly be added to the pool itself, which is protected from access by users of the pool, which is at least substantially isolated from the corrosive chemical agents, bacteria, and algae within the pool water itself, and which is relatively simple, easy to install, and maintenance-free thereafter.

BRIEF DESCRIPTION OF THE DRAWINGS

FIG. 4 is a sectional view of the bleeder valve assembly of FIG. 3;

FIG. 5 is a side view, partially in section, of the flapper valve of FIG. 1; and FIG. 6 is a sectional view of the diaphragm valve apparatus of FIG. 1.

SUMMARY OF THE INVENTION

Figure 1:
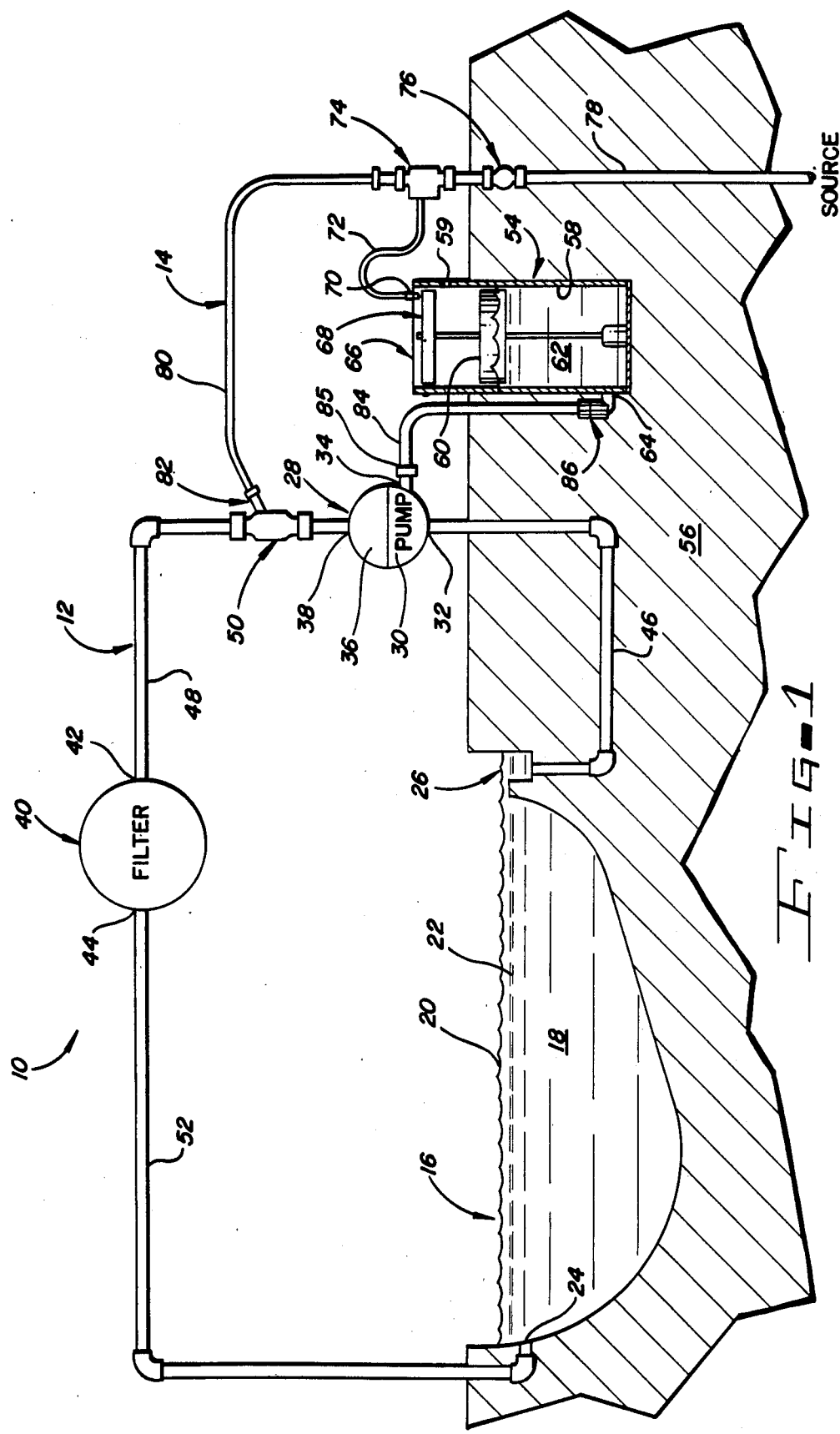
FIG. 1 is a sectional view of a swimming pool and associated pool water recirculation system employing the pool water level control system of the present invention.

It is an object of this invention to provide a method and apparatus for automatically adjusting or controlling the level of water in a swimming pool or the like.

It is another object of the present invention to provide an automatic monitoring, level detecting, and level-adjusting apparatus whose installation does not require extensive modification of the walls or deck of the pool or the like.

It is a further object of the present invention to provide a method and apparatus for automatically adjusting the level of water in a swimming pool which is remote from the pool itself.

It is yet another object of the present invention to provide a method and apparatus for monitoring the level of water in a swimming pool by siphoning water from the pool recirculation system.

It is still another object of the present invention to provide an isolation valve which permits bi-directional seepage but blocks a forced flow in either direction so that the water level in a float chamber can be isolated from the circulation system when the pump is operated while permitting siphoning to occur when the pump is turned off.

It is still a further object of the present invention to provide a pool water level control system which does not require excavation other than placing the float chamber at least partially below the water level in the pool.

It is yet a further object of the present invention to provide a method and apparatus for automatically controlling the level of water in a swimming pool wherein the monitoring of the actual water level in the pool is accomplished by monitoring the level of a float supported on water siphoned from the pool within a float chamber adjacent the pool.

It is still another object of the present invention to provide a unique magnetic over-the-center toggle latch for insuring that the control system does not function until the actual water level in the pool drops a predetermined distance or amount below the predetermined desired water level.

These and other objects and advantages of the present invention are accomplished in an automatic control system for use in a swimming pool having a pool inlet, a pool outlet, a swimming pool water circulation system including filter means for cleaning the circulated pool water, and a pump for circulating the water therein.

The control system detects whenever the level of water in the swimming pool is at least a predetermined distance or amount below a predetermined desired water level and for controlling the input of fresh water into the pool in response to the detected level for restoring the water in the pool to said predetermined desired water level.

A float chamber housing is operatively disposed at least partially below the water level in the pool, and the float chamber housing includes a float chamber, a float chamber inlet means for inputting only swimming pool water siphoned from at least one of the swimming pool and the water circulation system. A conduit means and check valve operatively couples the float chamber inlet to either the pool or the water circulation system for siphoning pool water into the float chamber until the water level therein is equal to the water level in the swimming pool thereby serving as an indication thereof.

A source of fresh water is provided, and a float within the float chamber monitors the float level therein as a measure or indication of the actual water level in the swimming pool. Actuation means responsive to the float means falling at least a predetermined distance or amount below the float level indicative of the predetermined desired water level initiates a command signal, and the float means returning to the float level indicative of the predetermined desired water level terminates the command signal.

A second conduit means operatively couples the source of fresh water to at least one of the pool and the water circulation system for supplying fresh water thereto, and a control valve is operatively disposed within the second conduit or the like for selectively controlling the flow of fresh water into the pool so that the control valve is responsive to the command signal for supplying of fresh water to the pool each time the pool level is detected to be below the predetermined desired level, and being responsive to the termination of the command signal to turn off the supply of fresh water into the pool whenever the pool level has been restored to the predetermined desired level, thereby automatically monitoring, detecting and controlling the level of water in the pool.

The present invention also contemplates a swimming pool system having a pool inlet, a pool outlet, a water circulation system operatively coupling the outlet to the inlet for filtering the pool water circulating under control of a pump, and a source of fresh water under pressure within such a system. An improved method for automatically maintaining the pool filled to at least a predetermined desired water level comprising the steps of (1) siphoning water from the water circulation system into a float chamber, (2) monitoring the level of water in the float chamber as an indication of the actual water level in the pool, (3) adding fresh water from a source directly to at least one of the pool and the water circulation system without passing through the float chamber whenever the monitoring step detects that the pool level has fallen at least a predetermined distance below the predetermined desired water level and (4) then terminating the supplying of fresh water whenever the monitoring step detects that the predetermined desired level has been restored.

DETAILED DESCRIPTION OF THE PREFERRED EMBODIMENT

The automatic control system of the present invention for monitoring the water level in a container of water, such as a swimming pool, or the like, detecting when the level of water falls a predetermined amount or distance below a predetermined desired level of water and controlling the input or addition of liquid to the system for restoring the level to the predetermined desired level as illustrated in the swimming pool system 10 of FIG. 1.

FIG. 1 illustrates a conventional swimming pool system 10 having a pool 16, a water circulation or recirculation system 12 and an automatic control system 14 associated therewith.

The swimming pool system 10 includes a conventional swimming pool 16 containing water 18 although any similar body of liquid in some type of pressured recirculation system could also be used with the present invention. For example, the system of the present invention could be used in the storage tanks of large evaporative cooler systems; to maintain water levels in remotely-located livestock watering tanks; etc. The swimming pool 16 is filled, in the preferred embodiment, with swimming pool water or water 18 having a swimming pool water level 20 and a predetermined desired water level 22. The swimming pool 16 includes a conventional swimming pool inlet 24 and a conventional swimming pool outlet 26. In the preferred embodiment, the swimming pool inlet 24 is shown as a simple inlet conduit that may be, of course, a conventional pressure-operated pool-cleaning apparatus such as an aerator which sprays the return or inlet water into the air to oxygenate it with water, or the like. Similarly, the swimming pool outlet 26 is preferably a conventional surface-skimming device located in the side wall of the pool 16 near the predetermined desired water level 22.

The swimming pool system 10 of FIG. 1 also includes a relatively conventional water recirculation or circulation system 12 for circulating and cleaning the swimming pool water 18 in the pool 16, and coupling the swimming pool outlet 26 to the swimming pool inlet 24. The swimming pool recirculation or conventional filtration system 12 includes a conventional swimming pool water pump 28 having a suction side 30 with a pump inlet 32 and a suction side outlet 34 as well as a pressure side 36 having a pump outlet 38. The recirculatio nsystem 12.also includes a conventional filter 40 having a filter inlet 42 and a filter outlet 44. The filter used is unimportant to the understanding of the present invention and any conventional cartridge filter system, sand filter, diatomatious earth filter, or the like, can be used.

The circulation system 12 also includes a conduit or pipe 46 connected between the swimming pool outlet or skimmer 26 and the pump inlet 32. A second conduit or pipe 48 is connected between the pump outlet 38 and the filter input 42 of filter 40 and may include, as indicated in FIG. 1, a flapper valve assembly 50 as hereinafter described. A third pipe or conduit 52 is connected between the filter output or outlet 44 and the pool inlet 24, a complete or continuous recirculation path is established between the swimming pool outlet 26 and the swimming pool inlet 24 to the swimming pool itself and the circulation path 12 comprising first conduit 46, pump 28, flapper valve 50, second conduit or pipe 48, filter 40, and third conduit 52. An important feature of the closed circulation system 12 of the present invention is the fact that the system 12 is closed or "unvented" to atmosphere so as to constitute a closed static circulatory system.

Typically, the circulation system may be operated by timing means, not shown, but well-known in the art, wherein the pump 28 is turned on and off periodically to activate and deactivate the circulation system depending on the needs for filtration in the water 18 of the pool 16. Some systems may run under the control of various types of detectors for detecting the need for filtration in the water 18 and the like as well, but this forms no part of the present invention.

The control system 14 of FIG. 1 includes a float chamber housing 54 buried at least partially in the ground, concrete, patio deck, surface material 56 or the like surrounding the pool, or somewhat adjacent to the pool 16, and at least a portion of the housing 54 is below the water level 20 of the pool 16 and preferably the housing 54 straddles the water level 20 as shown in FIG. 1. The float chamber housing 54 includes a generally cylindrical water-tight float chamber 58 containing a vertically positionable float member 60 supported on a column or quantity of siphoned pool water 62 within the float chamber 58. The housing 54 is vented or open to atmosphere, as indicated by reference numeral 66, and includes an actuation means 68, as hereinafter described, including a pressure relief valve apparatus 70 and a pressure conduit or tube 72. The input of the tube 72 is connected to the output of the pressure relief valve 70 while the outlet of tube 72 is connected to the control input of a pressure-operated diaphragm valve 74. The valve 74 has the valve input connected to the valve outlet of an anti-siphon valve 76 whose valve input is connected via conduit or pipe 78 to a source of fresh water under pressure such as the city water system, tap water, pump water or the like. The output of the diaphragm valve 74 is connected via conduit or tube 80 to the central input 82 of the flapper valve 50, as hereinafter described. Lastly, a two-way tube or conduit 84 is connected between the tube outlet 34 on the suction side 30 of the pump 28 and the single inlet conduit 64 of the float chamber 58. The two-way conduit 84 includes a check valve assemlby 86, as hereinafter described.

The system of FIG. 1 utilizes a known principle of physics to accomplish water level monitoring and detection. The principle of siphoning is unused or perhaps even unknown or unrecognized in the pool level control art. The principles of siphoning a liquid from a closed static circulatory system makes it possible, even when the system is positioned above the outside, or involves open or vented reservoirs, to siphon liquids having a differential level therebetween. This means that the static pressure in the circulation system 12 does not change the pressure in conduit 84 and the vented chamber 58 since the weight of the liquid under static pressure within the recirculation system 12 does not change the pressure coefficient between the pool 16 and the float chamber 58. Water 18 in the pool 16 and the siphoned water 62 in the float chamber 58 will seek equal levels regardless of the elevated static pressures involved.

The control system 14 of the present invention provides an apparatus and a method for monitoring the actual level of liquid or water 20 in the pool 16; for detecting when the level 20 of water 18 has dropped at least a predetermined distance or amount below a predetermined desired water level 22; and for controlling the replacement of lost water in periodic sequences, such as each time the timer system or the like enables the pump 28 to turn off, without the necessity of excavating the local terrain to install below water-level plumbing such as required in most of the systems of the prior art. The detection of the actual water level 20 in the pool 16 is achieved, in the preferred embodiment of the present invention, as illustrated in FIG. 1, without replacing or monitoring, detecting or refilling devices inside the actual pool 16 itself. While prior art systems require that water be drawn from the pool to a float chamber from below the actual water level 20 and connected to an adjacent vessel which must also be placed below the water level 20 of the pool 16 so the water of the pool 16 is transferred or supplied to an adjacent vessel, such as a float chamber, and the adjacent vessel filled to an equal level only by the pressure in the first vessel or the pool 16.

The present invention does not transfer fresh water through the chamber to the pool at all, and only transfers pool water from the pool 16 to the float chamber 58 by a siphoning effect when the pump is off and not by sub-level pressure within the pool 16. The siphon principle of the present invention is preferably achieved by connecting a siphon tube or conduit 84 with one end attached to the float chamber inlet and the opposite end attached to the pump output 34 on the suction side 30 of the pump 28. The clean-out connection 34 of the pump 28 is readily available, and substantially all pool pumps provides a convenient and accessible way of siphoning water from the closed recirculation system to the float vessel 54. The clean-out connection or outlet 34 is normally provided with a filtering screen to prevent the entrance of dirt into the siphon tube 84, but this is well-known in the prior art and is not described in detail herein.

The opposite end of the siphon tube 84 is connected to the float chamber through a check valve which closes when suction in the siphon tube is created, as when the recirculating water in the system 12 is moving as the pump 28 is operated. The check valve 86 completely isolates the float chamber 58 from the recirculation system 12 as long as the pump 28 is operating. As soon as the timing means or recirculation loop control system turns off, the pump 28 stops and the inertia of the water flowing in the closed static system of loop 12 continues for an instant thereby causing the siphon tube 84 to be pressurized to open the check valve 86 thereby assuring a siphoned flow of water into the float vessel and allowing the siphoning effect to draw pool water from the recirculation system 12 or the pool 16 into the float chamber 58 via tube 84. Eventually, sufficient water will be added by the control system 14, as hereinafter described, and the float level will be restored to that position indicative of the desired predetermined water level 20 in the pool 16. At this point, the actuation means 68 will close the valve 74 to terminate the flow of fresh water into the recirculation system 12 or pool 16 via flapper valve 50, and the system will again begin monitoring the actual level of water in the pool 16 until it is again detected to have fallen a predetermined distance or amount below the predetermined desired water level.

Again, it is important to note that the recirculation system 12 is a closed static system which eliminates the need for any substantial underground excavation and permits the use of an open or vented float chamber in which only a portion of the float chamber 58 is below the actual water level 20 of the pool 16. There is no need for underground connections between a first point in the pool 16 below the water level 20 and a second point in the float chamber below the water level therein, nor is there a requirement that the siphon end of the tube 84 be connected to any specific location in the recirculation system, such as below the water level 20, as in the prior art. In fact, while it is most convenient to attach the siphon end of the tube 84 to the clean-out outlet 34 of the pump 28, it can conveniently be taken anywhere along conduit 46 between the pool outlet 26 and the pump inlet 32 or, alternatively, anywhere along conduits 48 or 52, if desired.

Additionally, the float chamber 58 includes only a single inlet 64 which receives recirculated pool water from the system 12 by siphoning or siphon action and not by direct pressure transfer, at a sub-level connection. Lastly, the only water 52 within the float chamber 58 is that siphoned through tube 84 from the recirculation system 12 of pool 16. None of the water 62 within the float chamber 58 flows back through the tube 84 to the recirculation system 12 of pool 16. The only water added to the recirculation system 12 is the water from the fresh water source under pressure in response to the control valve 74 operated by the recirculation mechanism or means 68 of the control system 14, as hereinafter described.

Figure 2:
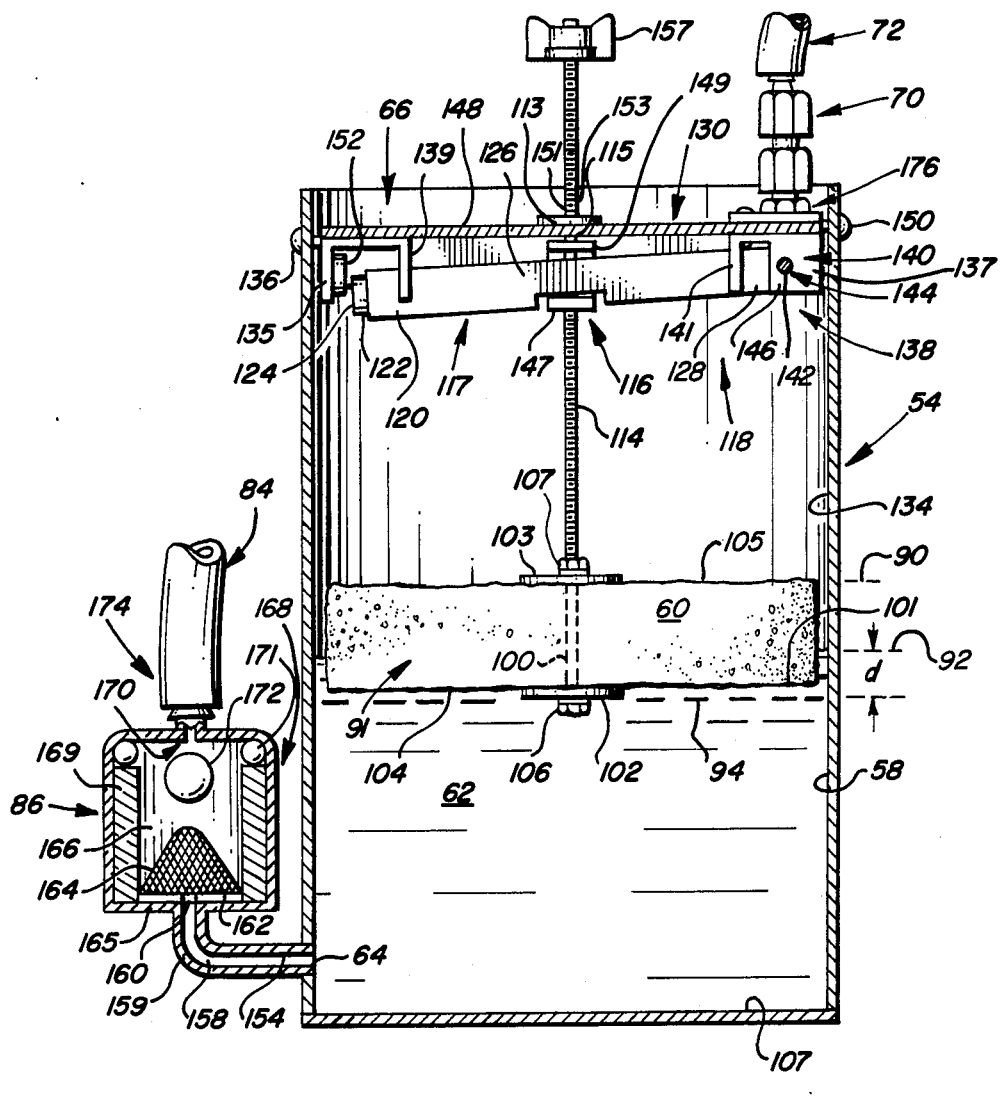
FIG. 2 is a sectional view of the float chamber housing, float, and actuation system of FIG. 1 of the present invention.

FIG. 2 is a sectional view of the float chamber housing 54 and the associated apparatus of FIG. 1 together with a sectional side view of the one-way valve apparatus 86 of FIG. 1 (greatly exaggerated in size for exclamation purposes only). In FIG. 2, the float chamber housing 54, which is preferably buried in the ground or surface material adjacent the pool 16 so as to straddle the water level 20 in the pool 16, includes a float chamber 58 in the general shape of a right cylinder. A disc-shaped float 60 is mounted therein for vertical reciprocal motion up and down in the float chamber 58 as the column of siphoned pool water 62 increases and decreases, as hereinafter described. The float level of the top, or bottom, or any given point on the float 60 may be thought of as being representative of the actual pool water level, and one such level in the float chamber then represents a predetermined desired float level indicative of the predetermined desired pool water level 22 of the pool 16 of FIG. 1. For example, the level 92 representing the level of water supporting the float can be used to establish the float level within the chamber 58. A predetermined distance "d" below the float level 92, indicative of the predetermined desired level of pool water 20, is represented by a predetermined desired float level 94, as hereinafter described, and it will be seen that the water level within the pool determines the water level within the float chamber such that the water 62 within the float chamber 58 must fall or go down the predetermined distance "d" between the actual float level 92 and the predetermined float level 94 before the actuation mechanism 68 is activated, as hereinafter described, to prevent oscillating action or continuous attempts by the control apparatus 14 of FIG. 1 to adjust the water level for very minor fluctuations or deviations in the pool level.

An upper rod-like vertically oriented member 114 has its lower end portion passing through a central aperture 100 of the styrofoam float 60. A lower washer-like member 102 is received over the lower end of the rod 114 and disposed flush against the lower surface 104 surrounding the aperture 100. A nut 106 is threaded onto the lower end and secured thereto for holding up washer 102 and rod 114 in a fixed relationship to one another. An upper washer 103 is positioned over the rod 114 and disposed flush against the upper surface 105 of the float 60 and retained at this position by a nut 107 threaded over the rod 114 to secure the rod 114—washers 102, 103 combination for tightly securing the float 60 thereto.

FIG. 2 also shows a latch assembly 17 including a latch 118 and a latch housing 119. The latch 118 is an elongated rigid member having a generally U-shaped cross section with the open end disposed downwardly. The moveable or free end portion 120 of the lever or beam 118 has a first magnet 124 rigidly secured to the distal end 122 thereof as by glue, adhesive means, or the like. The opposite or pivoted end portion 128 includes a pair of apertures 144 through the downwardly disposed sides of the lever for serving as the pivot point of lever 118 and the relatively less moveable end portion 143 extend to the end of lever 118.

A latch housing 119 includes an elongated housing 130 having a top 148 and front and rear sides 131, 133 distending downwardly therefrom to form an enclosure open only on the bottom for defining a housing channel for operatively receiving the lever 118 therein. The cross section of the housing 130 is generally U-shaped and inverted with opposite longitudinal ends closed by end panels 135, 137 secured therein by adhesive means, screws, or any such conventional fastening means. A generally U-shaped inverted member 139 is secured to the top 148 and sides 131, 133 of the latch, housing 119 parallel to and spaced apart from the end panel 135 so that the free end 120 of the lever 118 can be moved into and out of the inverted downwardly-facing slot in the inverted U-shaped member 139. A second magnet 152 is secured, as by adhesive means or the like, to the interior surface of the end panel 135 facing the first magnet 124 of the beam or lever 118 when their magnet axes are aligned.

A second generally U-shaped inverted member 141 is secured to the inside top 148 and sides 131, 133 of the housing 119 parallel to and spaced apart from end panel 137. The pivoted end portion of the lever 118 is adapted to be received within the downwardly-facing slot or open end of the inverted U-shaped member 141. Another inverted U-shaped member 143 is fixedly mounted within the space between the member 141 and the end panel 137 with its top flush against the inside top surface of the housing 119. An aperture is provided through the top of member 143 and through the top 148 of latch housing 119. A plastic sleeve member is fitted within the aperture to form a downwardly facing seat, as hereinafter described.

The intermediate or central portion 126 of the latch housing 119 has an aperture 113 having the elongated threaded rod or stem extending therethrough and a corresponding aperture in the top surface 145 of the lever 118. A nut-like member 147 is threaded onto the rod 114 to loosely secure the latch 118 within the housing 119 between the nut 147 and a washer 149 about the top aperture 113. There is sufficient spacing or "play" to enable the magnetic toggle action to occur without actually lifting float 60. A wing nut 157 or the like, is threadedly received over the top of the stem 114 to tighten about washer 149 to set the desired degree of play or looseness. A pivot pin 142 through pin apertures 144 enables the desired movement of the lever 118 with respect to the latch housing 119 and float 60.

As previously described with reference to FIG. 1, the float chamber housing 54, and therefore the float chamber 58, is provided with a single float chamber inlet 64 which may be coupled directly through the cylindrical walls 134 to the hollow interior 154 of a conventional inlet tube connector 155 and then into the interior 158 of the outlet 159 of the check valve 86 and an outlet vent or overflow relief vent 59. A circular disc 162 provides a base support to an inverted conically-shaped filter or screen 164, and a central aperture 160 in the support 162 opens into the interior 158 of the outlet 159. The base support 162 of the screen 164 is supported by the annular shoulder portion 165 at the base of the valve body or housing 168. The screen or filter 164 serves to catch debris within the unfiltered pool water and prevent it from clogging the float chamber 58 or otherwise interfering with the operation thereof.

The body portion 168 of the one-way check valve 86 also includes a collar-like sealing member 169 and an O-ring 171 surrounding a central valve inlet aperture 170. Inlet 170 communicates directly with the hollow interior 154 of the tube-coupling means or nipple 156 and then to the hollow interior of the conduit 84. A spherical member or ball 172 is freely positioned within the hollow interior 166 of the valve body 168 and is responsive to pressure changes and the like so that the ball 172 is normally drawn or seated against the inlet aperture 170 by the suction in tube 84 provided by the suction side 30 of the pump 28 so long as the pump 28 is in operation. This serves to totally isolate the float chamber 58 from the recirculation system 12 so long as the pump 28 is in operation. However, as soon as the pump 28 is turned off, by conventional timing means or the like, a momentary surge or impulse of water within the circulation system 12 passes through the conduit 84 and serves to unseat the ball 172 from the inlet or seat 170. The unseating enables a complete siphon path to be established between the circulation system 12 via the suction side outlet 84 of the pump 28 through tube 84 and the check valve 86 to the inlet 64 of the float chamber 58 so that the float chamber 58 can now freely siphon swimming pool water 62 from the recirculation system 12 until the actual water level within the pool 16 and the actual water or float level 92 within the float chamber 58 are equalized by the siphoning action.

Similarly, whenever the catch basket of the pump is cleaned, the closed recirculation path is broken and water flow through conduit 84 to unseat ball 172 and supply too much water to the float chamber 58. When the basket is recovered and the system reprimed, the high level of water in the float chamber 58 could cause a high flow velocity in the opposite direction causing ball 172 to seat in 170 and isolate the float chamber 58 in error. To avoid this, the overflow relief vent 59 is provided to prevent inadvertant valve closing. During such overfill conditions, once the closed recirculation system is normalized, the slow moving reverse siphon action will draw the excess water from the float housing 58 and into the pump 28 until the levels are again equalized, and since the reverse siphon flow is relatively slow, the ball 172 will remain unseated.

A conventional, internally-threaded nut member 176 serves as a coupling means to interconnect the portion of the actuation means 68 of FIG. 2 to the control relief valve outlet 72 from the relief valve as hereinafter described.

Figure 3:
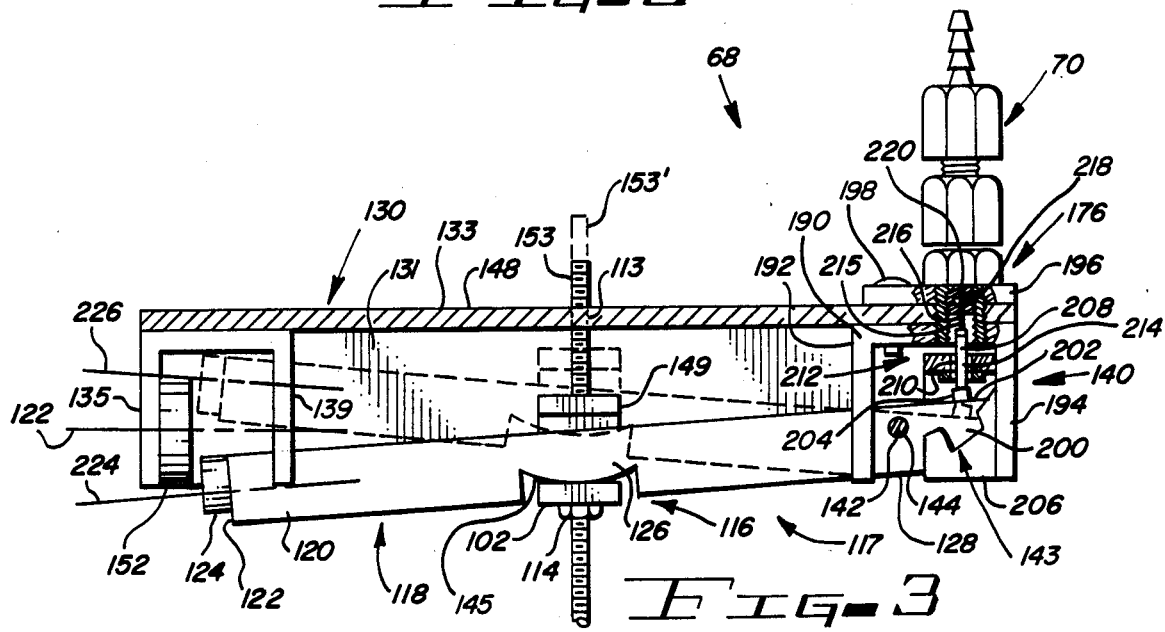
FIG. 3 is a sectional view of the latch and bleeder valve portion of the actuator system of FIG. 2.

FIG. 3 shows the actuation assembly 68 including the latch frame housing 119, the float lever assembly 117, pressure relief valve 70, and the components associated as previously described.

The fixed or pivoted end portion 128 of the lever 118 on the opposite side of the pivot pin 142 from the free end 120 includes a head-shaped portion 200 having a top support surface 202 fixedly mounting a contact member 204. The head-shaped portion 200 is free to move vertically up and down within the hollow interior 206 formed by the channel-forming member 143. The float 60 raises and lowers the head portion 200 of the lever 118 causing the contact 204, which carries the lower distal end portion of the needle assembly 212, to vertically reciprocate into an out of needle valve seat 218, thereby enabling the needle valve 70 to be normally-closed or sealed when the lever 18 is in the below-the-center or off-center-low toggle position indicated by lever axis 224 while it is able to withdraw from the needle valve seat 218 when the head portion 200 pivots downwardly about the pin 142 when the lever 118 toggles or actuates to the over-the-center-high position illustrated by lever axis 226. In this manner, the pressure relief needle valve 70 is normally deactuated or sealed from the atmosphere but is opened to the atmosphere when the lever 118 toggles from the non-actuated position axis 224 to the actuated lever position represented by axis 226.

It will, of course, be recognized that the magnet 124 on the distal end 122 of the free end 120 of the lever 118 and the magnet 152 mounted to the end panel 135 are set to face one another in like polarity. This causes a repelling force on either side of magnetic center as illustrated by axis 222. The free end 120 of the lever 118 is guided to travel in an up and down position as it pivots about pin 142. Since the float 60 is attached to the rod 114 which is loosely secured about the mid-portion 126 of lever 118 by fastening means 116, the mid portion 126 rises and falls with the float 60 and forces the free end 120 of the lever 118 to pivot about pin 142. This pivot action physically forces the magnets to align with the center or fixed axis 222 with the lever axis and repell each other into the actuated position illustrated by axis 226, and vice versa, when the water level falls and the weight of the float pulls the lever axis to where it is again aligned with axis 222 causing it to flip or to be repelled away to the lower position illustrated by the unactuated position magnetic axis 224.

The lever or armature 118 pivots in the fulcrum established at approximately an eleven-to-one ratio in the preferred embodiment of the present invention, but many other fulcrum ratios can also be used. It will be noted that the linkage including pin assembly 212, guide collar 208, and contact 204 together with the pivoted end of the latch housing 130 is used to open and close the presure relief valve 70 in relation to which side of the magnetic field or axis 222 the lever or armature 118 is positioned on in response to the motion of the rod or float stem 114. The required water level differential for opening and closing the magnetic toggle pressure relief valve assembly in the actuator means 68 is approximately ½ inch of water in the preferred embodiment of the present invention, although different water level differentials can easily be established using the magnetic toggle system of the present invention. The actual operation of the actuator means 68 of FIG. 3 will be hereinafter described with reference to operation of the pressure relief valve of FIG. 4 and the fresh water diaphragm control valve of FIG. 6.

Pressure relief valve 70 of FIG. 4 includes an upper body portion 230 having a generally cylindrical hollow interior or channel 238 therethrough. The upper body portion 230 includes an elongated, externally-threaded stem portion 232 and an internally-threaded head portion 234. The internal threads of the head portion 234 are formed in the interior of the head channel aperture 236. The valve 70 further includes a lower valve body portion 240 having a generally hollow interior channel which includes an elongated central channel 248 and an internally-threaded channel 250. The lower valve body portion 240 includes a first or upper, externally-threaded stem portion 242, an intermediate head portion 244, and a second or lower elongated stem portion 246 with the hollow interior extending through stem portion 242, head portion 244, and rim portion 246 via channels 248 and 250, respectively. The externally-threaded stem portion 242 of the lower body member 240 is adapted to be threadedly received within the internally-threaded head aperture 236 of the upper head portion 234. The externally-threaded stem portion 232 of the upper body portion 230 is adapted to be threadedly engaged within the internally-threaded lower end portion in the hollow interior 265 of the internally-threaded nut-like member 268. The opposite portion of the hollow interior 265 tapers to an aperture port 274 which communicates the tapered hollow portion 272 of interior chamber 265 to the hollow interior of the tube connector 276, as conventionally known in the art.

A coiled spring means 260 has a reltively wide base portion 266 seated against the tapered portion of the upper end of the hollow interior 265 of the head member 268 spring coils of decreasing diamemter interconnecting the base coil portion 266 with a relatively common lesser diameter coil portion 262 with spring portion 262 extending through the hollow interior chamber 238 of the stem 232 of the upper body portion 230 and into the hollow interior 248 of the hollow stem portion 242 of the lower end portion 240. The plug-like member 252 is a generally cylindrical, externally-threaded portion 255 adapted to be threadedly engaged within the internally-threaded hollow interior 250 of the second stem 246 of the lower body portion 240. a generally tapered portion 253, integral with the portion 250 and in the general shape of a truncated cone having a tapering the head 244, extends into the hollow interior 248 of the first stem portion 242 in the lower body portion 240. The lower end 261 of the relatively constant diameter coil portion 262 of the spring 260 is adapted to be seated on an annular support member 256 operatively carried by the truncated distal end portion of the cone 253. A hollow central channel 254 is provided through both the truncated conical portion 253 and the cylindrical portion 255 of the plug member 252. In the upper or actuated position represented by axis 226, the pin 278 is removed from the seat 218 allowing the pressure relief valve 70 to be vented, and when the float 60 sinks to indicate a loss of water in the chamber, and hence the pool, stem 114 forces the movable magnet 124 to become aligned with the axis of the fixed magnet 118 and toggles it to the de-actuated position of axis 24 to close the seat 218 of the pressure relief valve 70 and actuate the control valve or diaphragm valve 74 to fill the pool.

The seat 218 communicates through the hollow interior channel 254 and the hollow interior of an extended guide portion 278 extending above the mounting platform 256 as a spring guide for positioning the lower coils 261 of the spring 260 and enabling the insertion or removal of the pin 216 the valve seat 218 to respectively seal and unseal the conduit or channel 254 for selectively unventing and venting the diaphragm chamber of the control valve 74 via the hollow interior of the upper portion of the coiled spring 260, the chamber 265, the pressure relief output aperture 274, the hollow connector stem 276, and the connecting pressure relief tube 272 which extends to the control valve of FIG. 6, as hereinafter explained.

FIG. 5 illustrates a sectional side view of the flapper valve 50 of FIG. 1. In FIG. 5, the flapper valve 50 is shown as including a flapper valve body portion 280 having a hollow central interior or chamber 282 communicating with a hollow end or neck portion 284 which is externally threaded to engage an internally-threaded portion of a cap-like connector 286 to provide a seal 288 about the flapper valve inlet 290. The opposite end portion of the flapper valve 50 includes an externally-threaded hollow outlet neck 292 adapted to engage the internally-threaded portion of the cap-like member 296 which positions a seal 298 about the flapper valve outlet 294 as conventionally known in the art.

The hollow central portion 282 of the central body portion 280 of the valve 50 is provided with an internally-threaded aperture 300 adapted to receive the externally-threaded stem portion 304 of the fresh water inlet tube 80 which serves as the fresh water inlet 82 in the hollow interior 282 of the valve body 280. The coupling connector 306, is provided with internally-threaded hollow interior which is adapted to couple or secure the end portion 80 to the threaded stem portion 304, as conventionally known in the art.

Fresh water under pressure is supplied from a source of fresh water through the conventional anti-siphon valve 76 of FIG. 1 and the control valve 74 of FIG. 6, as hereinafter described, and then through a tube or conduit 80 and inlet 82 to the hollow interior 282 of the central valve body portion 280 via the inlet aperture 302 at the distal end of the threaded stem portion 304. The hollow interior 282 of the central body portion 280 is provided with an annular shoulder 312 about the junction of the hollow interior 282 with the hollow interior of the stem portion 284 and a flapper valve is adapted to have the seal 316 positioned in the annular shoulder 312 and seated on the shoulder 312, for sealing the hollow interior 282 from the hollow interior of the stem portion 284. The flapper valve assembly 308 also includes a pivot attachment 310 for securing one portion of the seal portion 316 of the flapper valve 308 to the shoulder 312 at the junction 314 of the intersection of the hollow interior 282 of the central portion 280 and the hollow interior of the stem portion 284.

The flapper valve assembly 308 also includes a input portion 318 coupled to the seal portion 316 for movement therewith. The flapper valve assembly 308 is adapted to normally open the channel between the hollow interior 282 of the central valve body portion 280 and the hollow interior portion of the inlet neck 284 so that when pool water is being recirculated within the recirculation system 12, it can enter the inlet 290, pass through the hollow interior of the neck portion 280, into the hollow interior 282 of the central portion 280, and then through the hollow interior of the outlet neck 292 to the outlet 294 for normally recirculating same.

However, as soon as the pump 28 has stopped, the absence of pressure on the pressure side 36 of the pump 38 will enable the flapper valve assembly 308 to close and seat on the shoulder 312 to isolate the swimming pool water at the inlet 290 from the fresh water under pressure being provided from the input or inlet 82 through aperture 302 to the hollow interior 282 and via the hollow interior of the outlet within portion 292 to the outlet 294 and then through the recirculation system 12 to the pool itself for filling it with fresh water from the source. As long as fresh water is entering the inlet 302 to the hollow interior 282, the pressure of the incoming fresh water will maintain the flapper valve assembly 308 closed or seated on shoulder 312 to isolate the fresh water from the recirculated water at the inlet 290 and enable the fresh water to be fed to the pool 16 through the recirculation system 12. As soon as the pump 28 is actuated, the fresh water supply is terminated and the pressure of the water of the inlet 290 will open the flapper valve assembly 308 to once more conduct water through the flapper valve 50 for recirculation and filtering before being supplied back to the pool, as conventionally known. The purpose of the flapper valve 50 is to control the input of fresh water from components 80, 82, 304 into 308 and then through the recirculation system 48, 40, 52, 24 via outlet 294 so as to prevent back pressure to the pump 28 via 62, 64, 86, 84 and 34 and prevent the unintentional buildup of water in the float chamber 58 causing erroneous float rise and actuation.

FIG. 6 illustrates, partially in section, the control valve assembly or diaphragm valve 74 of the present invention which controls the supply or input of fresh water under pressure to the swimming pool 16 via the recirculation system 12 of the system of FIG. 1, as previously described. FIG. 6 shows the diaphragm control valve 74 as including a generally cylindrical portion 320 having a fresh water inlet 322 adapted to be connected within the conduit 46, 48 or 52 of the recirculation system 12 of FIG. 1 via a conventional coupling device 324, well-known in the art. The fresh water inlet 322 is coupled directly to a fresh water inlet chamber 326 which outputs into a central input chamber 328. The outlet of the central chamber 328 is through an aperture 330 which communicates with a hollow interior channel 332 having an elongated pin member 334 extending centrally therethrough. The flexible diaphragm 336 is used to separate the input body portion 320 of the valve assembly 74 from the mounting block portion 344, and the inner portion 336 insures that the area about the member 372 is sealed from the central inlet chamber 328. A coiled compression spring 338 has one end wrapped about the downwardly extending, annular portion 373 of mounted portion 344 for securing it thereabout and restraining movement against the upper surface of the mounted block 344 with the opposite coiled end portion of spring 338 being wrapped around the cylindical end portion 367 of a central portion 375. A central or plug portion 375 includes an outwardly-extending flange portion 369 which clamps the resilient diaphragm or seal 336 against the annular shoulder portions 376 and 377, respectively, and against the upper distal end portions 378 of the outer portion 375. A stated above, the lower end of the spring 338 is coiled about the circular extension 367 of the central portion 375 and the base is disposed upon the inner portion of the flange 369 so that the inner portion of the top surface of the flange 369 insure that the diaphragm member 336 provides the necessary pressure seal between the upper member 350 and the lower chambers 328 and 362, respectively. The central portion 375 also includes a hollow, elongated, internally-threaded stem portion 370 which is adapted to threadedly engage the external threads of the screw-like member 372 and is adpated to be secured therein for providing the input 330 and hollow passage 332 through the central portion 375 and the diaphragm 336 and the hollow interior chamber 350 on the opposite side of the diaphragm 336. In addition to the collar or ring 373 positioning the upper end of the coil spring 338 against the base or mount 334, a central cylindrical portion 374 within the annular collar 373 secures the member 334 to the center of the spring 338 and the hollow central passage 332 to extend through the head of the member 372 and the inlet 330 of the hollow central inlet passage 328.

Control valve 74 of FIG. 6 also includes an outlet 366 adapted to be operatively coupled to the fresh water conduit or pipe 80 of FIG. 1 via conventional coupling means 364. The outlet 366 communicates with the outlet passage 360 in the generally hollow interior central portion 320 of the valve 74. The outlet passage 360 communicates with the vertical passage 362 having a relatively narrow outlet conduit 363 which is normally sealed by the diaphragm 336 from the hollow interior 365 of the chamber 350 in the opposite side thereof. An additional conduit or pipe 356 connects the outlet chamber 360 with the upper chamber 352. This passage is blocked or sealed by the member 358 for preventing its use in the present application. Therefore, as long as the pressure in the pressure outlet chamber portion 352 is vented to the atmosphere through the hollow stem connector 276 and 272, via the central relief valve of FIG. 4, the pressure in the hollow chamber 350 above the diaphragm 336 will be less than the pressure in the lower chamber 328 and greater than the pressure in the outlet chamber 362 so that the diaphragm valve 336 will remain seated and seal the passage of fresh water under pressure from the valve inlet 322 to the outlet 366 thereby preventing the fresh water from entering the pool. However, when the pressure relief valve of FIG. 4 is closed in response to the needle valve being seated, the pressure in chamber 352 and hence chamber 365 becomes less than the pressure in the inlet chamber 328 causing the diaphragm valve 336 to open and the fresh water under pressure to pass through the inlet 222, the inlet passage 226 and the central inlet chamber 328 to the upper chamber 350 and then through the chamber portion 365 conduit 363 to the outlet chamber 362 and outlet passage 360 to the valve outlet 366.

In the preferred embodiment of the present invention, the hydraulic refilling valve or diaphragm control valve 74 of FIG. 6 is preferably a modified Richdel, and preferably an electric solenoid-operated valve model number 1204. The valve is normally designed to be self-actuating by an inside flow pressure alone. In its designed operation, the internal water pressure is passed through a bleeder screw inlet 330 via the conduit or fluid passage 332 into the upper chamber 350 and is commonly referred to as the diaphragm chamber 350. When the valve is in an open position or "on", the fresh water under pressure is allowed to pass from the inlet 322 to the diaphragm chamber 350 and then through a relief vent passage 356 back to the outlet chamber 360 and then through the valve outlet 366 to the recirculation system 12 through flapper valve 350, as previously described. In the normal operation of the Richdel electric valve, an electric solenoid is actuated to lift a plunger which normally covers the relief vent 356 since the valve is normally-closed in ordinary operation, and the plunger normally covers the relief vent 356 to prevent operation of the valve 74. However, the system of the present invention modifies the Richdel electric valve by placing a stop member or plug 358 in the relief passage 356 to disable same. The electric solenoid system is removed and replaced by a relief tube 72 and the pressure relief valve 70 of FIG. 4 as previously described. The pressure relief valve opens in command to pressure applied to the fluid mechanism and the positioning of the magnets on the free end of the lever as previously described.

The hydraulic refilling valve or control valve 74 is connected by a pipe or tube to a swing check valve or anti-siphon valve 76 which is normally installed in most swimming pool plumbing systems. The purpose of this valve 76 is to assure a flow of fresh water when the hydraulic valve 74 is open so that no dirty pool water can flow back into the source of fresh water for contaminating same. This also assures that it does not interfere by being pressurized at the pump where the siphoning principal is in the process of monitoring and detecting the water level in the pool. Therefore, the swing check or anti-siphon valve is installed at the outlet side of the pump and may be, for example, an anti-siphon valve such as that manufactured by Flow Control Corporation which is modified by installing an injection pipe at the front of the swing check portion so that when the water enters from the hydraulic refilling valve, it forces the swing check or flapper valve to close and prevents the siphon loop from being pressurized during the refill cycle. This assures accurate level sensing or monitoring during the filling cycle itself.

The check flow valve 86 of FIG. 2, as previously stated, includes a free-floating check ball or sphere 172 which, in the normal condition, will fall and have its path limited by the screen barrier or member 164 so that it does not seal the outlet 160 in the base 162. When the pump 28 is turned on, however, the suction from the suction side of the pump will attract or draw the check ball to the seated position to isolate the float chamber from the recirculation system during pump operation. Of course, the position of the check valve can be alerted so as to enable it to function on the pressure side of the circulation pump by turning the valve in the opposite direction. This is functional but the suction side is recommended in the preferred embodiment so as to take advantage of the inertial surge of water to cleanly open the valve and remove any possible air in the siphon tube initially so that siphoning can begin quickly for level equalization.

The reverse flow prevention valve or anti-siphon valve 76 may also be a conventional unit such as that manufactured by Flow Control and it is not modified in its use in the present invention. Its function is simply to be secured to the inlet side of the hydraulic refilling valve to prevent the reverse flow of contaminated pool water into the fresh water supply in the event of a drop in the water pressure.

Further, the system could, of course, be altered to replace the magnetic toggle pressure relief valve assembly with a floating magnetic read switch or microswitch or the like. With slightly less effective results, the switch could also act in direct response to the float position in the float vessel. It could, for example, be connected in series with a 24 V AC supply so as to be electrically activated as known in the art. The valve could also be modified and a vacuum switch could be installed at the suction side of the pump to make and break the circuit in the event the pump would start during the filling operation. The system could also be modified by supplying it with a solar electric storage or DC solenoid and this would require further use of a solenoid for the plunger action and stop another solenoid to release the catch. Regardless, a number of obvious modifications can be made in the actual valve used in the present invention and in the actuation means without significantly altering the basic concept of the present invention, although the magnetic toggle or latch is unique in and of itself, at least to the present inventor and for use in a water level-detecting and adjusting systems.

In summary, therefore, the present invention contemplates an improved system and method for monitoring the actual level of water in the pool; for detecting when the level falls at least a predetermined distance below a predetermined desired level of water; and for controlling the input of fresh water under pressure into the pool for restoring the water level therein to said predetermined desired pool water level.

The method of the present invention involves the steps of circulating the pool water between a pool outlet and inlet and locating a float chamber at least partially below the pool water level so that the position the float within the chamber is indicative of the actual pool water level. The method further involves the steps of siphoning pool water from the recirculation system whenever the pump stops for filling the float chamber to position the float at a level indicative of the actual level of water in the pool, and then adding fresh water under pressure to the pool whenever the float position indicates that the pool water level has fallen at least a predetermined distance below the predetermined desired level, and for terminating the addition of fresh water under pressure to the pool whenever the float position indicates that the actual level of water in the pool has been restored to the predetermined desired level.

The method or operation of the present system also contemplates the siphoning of pool water from the recirculation system or the pool itself to fill the float chamber so that the equalized levels indicate the actual level of water in the pool for monitoring and detection purposes and for normally-isolating the float chamber from the recirculation system whenever the pump is in operation, but for enabling the siphoning opertion to go on immediately after the pump is turned off and the initial surge of the circulating water caused by the inertia thereof opens the one-way valve and hence the siphoning path.

The use or employment of the siphoning system, principle, or concept in the present invention, enables the present system to be used and installed without requiring extensive excavation or digging in the terrain or ground surrounding the pool since the connection between the float chamber and the pool does not have to be made directly between the two at some point or position beneath the actual water level in the pool and, in fact, below the lowest water level that the pool will reach prior to refilling. Furthermore, since the direct pressure of the pool water itself is not used to supply the pool water to the float chamber, the connection can be made even above ground to siphon the pool water from the conduit coupling to the pool outlet to the suction side of the pump but it can also be made anywhere in the recirculation system even on the opposite side of the pump between the pump outlet and the pool inlet, if desired, with minor modifications as previously described.

The present system is much simpler, easier to operate, easier to maintain, and less costly to install and maintain than the systems of the prior art. Since no extensive excavation is necessary and no direct pressure drive connection, the cost for maintainability is considerably reduced immediately. Furthermore, the system does not require special purpose valves for full bi-directional flow or the like, since a single connection is made between the fresh water supply line and the recirculation system for supplying fresh water to the pool and a single connection is made between the recirculation system and the float chamber for two-way siphon flow only for monitoring and detecting pool levels. The present system does not use a float chamber as both a mixing point or inlet for supplying fresh water to the system nor is it allowed full two way flow between the recirculation system and the control system itself, thereby enabling a simple siphon flow path and a single inlet in the float chamber which again reduces costs and maintainability. Furthermore, the input of fresh water into the float chamber interferes with the ability to monitor and detect the actual pool level during the filling operation itself, and adds considerable confusion and inaccuracy to the overall operation.

Applicant provides a unique method and apparatus for monitoring, detecting and maintaining or controlling the water level in the pool to insure that the system is periodically restored to a predetermined desired water level utilizing an relatively low cost, easy to maintain, easy to install, and extremely simple system to do so.

While the present invention has been particularly described and illustrated with reference to the preferred embodiments of the present figures, it will be understood by those skilled in the art that various changes and modifications can be made in form, structure, detail, and method, without departing from the actual spirit and scope of the present invention which is limited only by the appended claims.

I claim:

1. A method of automatically adjusting the level of water in a swimming pool to maintain at least a predetermined desired water level comprising the steps of:
    periodically circulating the pool water between the pool outlet and the pool inlet;
    locating a float chamber at least partially below the pool water level such that the position of a float within the chamber is indicative of the pool water level;
    siphoning pool water to a level above the pool water level when the circulation stops for filling the float chamber to position the float at a level indicative of the actual pool water level;
    adding fresh water under pressure to the pool whenever the float position indicates that the pool water level has fallen at least a predetermined distance below the predetermined desired level; and
    terminating the addition of fresh water under pressure to the pool whenever the float position indicates that the pool water level has risen to said predeterimined desired level.

2. The method of automatically adjusting the level of water in a swimming pool of claim 1 wherein the step of siphoning for filling said float chamber includes the step of excluding any input of fresh water under pressure from the float chamber until it has been mixed with said pool water.

3. The method of automatically adjusting the water level in a swimming pool of claim 2 wherein the step of adding fresh water under pressure to the pool includes coupling a source of fresh water directly to at least one of said pool and said water circulation system without passing through said float chamber.

4. The method of automatically adjusting the level of water in a swimming pool of claim 1 wherein said step of circulating the pool water includes periodically pumping the pool water for circulating same between a pool outlet and the pool inlet and the step of isolating the float chamber from the water circulation system whenever said periodic pumping occurs and the step of coupling the circulated water to the float chamber for siphoning the circulated pool water therein whenever the periodic pumping stops.

5. The method of automatically adjusting the water level in a swimming pool of claim 4 wherein the step of adding fresh water under pressure includes preventing pool water from contaminating the fresh water source.

6. In a swimming pool system including a pool, a pool inlet, a pool outlet, a water circulation system operatively coupling the outlet to the inlet for filtering the pool water, and a source of fresh water under pressure, an improved method of automatically maintaining the pool filled to at least a predetermined desired water level comprising the steps of:
    siphoning water from the water circulation system to a level above that of the pool water level and then to a float chamber whenever the circulation system is inoperative and isolating the float chamber from the water circulation system whenever circulation is operative;
    monitoring the level of water in the float chamber as an indication of the actual water level in the pool;

adding fresh water under pressure from the source directly to at least one of the pool and the water circulation system without passing through the float chamber whenever said monitoring step detects that the pool level has fallen at least a predetermined distance below said predetermined desired level; and terminating the input of fresh water whenever said monitoring step detects that said predetermined desired level has been attained.

7. The improved swimming pool system of claim 6 wherein said siphoning step includes the step of operatively coupling said water circulation system to a level above that of the pool water level and to a float chamber inlet to enable a siphon flow of pool water into the float chamber, and drawing the pool water into the chamber for filling it to the level of the pool water by siphon-action alone.

8. The improved swimming pool system of claim 7 wherein said step of drawing includes normally isolating said float chamber from the water circulation system when the water is circulating and enabling the siphoning action only after the circulation stops and the resulting surge of circulating water within the water circulation system enables the flow of pool water from the water circulation system to the float chamber by siphoning action.

9. The improved swimming pool system of claim 7 wherein said step of siphoning water from the water circulation system to the float chamber includes the steps of providing a pump for intermittedly circulating pool water through the water circulation filter system;

normally isolating the float chamber from the water circulation system whenever the pump is operating and coupling the water circulation system to the float chamber for enabling said siphoning to occur only after a surge of water pressure occurs when said pump is turned off.

10. The improved swimming pool system of claim 1 wherein the step of monitoring includes the steps of providing a float chamber;

positioning the float chamber adjacent the pool and at least partially below the water level of the pool;

supporting a float within the float chamber such that the level of the float within the float chamber is indicative of the water level in the pool;

activating a first command whenever the float moves from the desired pool level to a distance predetermined level lower within the float chamber;

initiating said adding step with said first command;

generating a second command whenever the float rises within the float chamber to said predetermined desired level from the water siphoned from the water circulation system; and triggering said terminating step with second command.

11. The improved swimming pool system of claim 6 wherein the steps of siphoning, adding and terminating include the steps of:

coupling a normally-open valve means between the source of fresh water under pressure and the water circulation system;

providing a relief valve within the float chamber;

opening said relief valve in response to said float having fallen said predetermined distance below said predetermined desired level within the float chamber corresponding to the predetermined desired level within the pool;

generating an actuation command in response to the opening of said relief valve and said float chamber;

opening said valve in response to said actuation command and to the water inside said valve having bled out of said valve for applying fresh water under pressure to said pool via said water circulation system;

rationing water from at least one of the pool and the water circulation system a point above the level of the water in the pool and back into the float chamber to equalibrate the level of water in the float chamber with the level of water in the pool;

generating a de-activation command whenever the relief valve closes in response to siphoned water within the float chamber having equilibrated; and deactivating the valve in response to said deactivation command stop the flow of fresh water under pressure.

12. The improved swimming pool system of claim 1 wherein said step of adding and terminating include:

providing a normally-closed valve between the source of fresh water under pressure and at least one of the pool and the water circulating system;

actuating the valve with an actuator command to open the valve to supply fresh water under pressure to said at least one of the pool and the water circulation system;

generating the actuation command whenever the float falls a predetermined distance below the predetermined desired level within the float chamber corresponding to the predetermined desired level of water in the pool;

generating a deactivation command whenever the float rises to said predetermined corresponding desired level on the water siphoned from the water circulation system into the float chamber; and deactivating the valve to stop the flow of fresh water under pressure in response to said deactivation command.

* * * * *